(12) United States Patent
Meranchik

(10) Patent No.: US 8,804,702 B2
(45) Date of Patent: *Aug. 12, 2014

(54) SYSTEM AND METHOD FOR DYNAMIC CALL ROUTING

(75) Inventor: Jay Meranchik, Dayton, NJ (US)

(73) Assignee: Global Convergence Solutions, Monroe, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/541,180

(22) Filed: Jul. 3, 2012

(65) Prior Publication Data

US 2012/0269188 A1     Oct. 25, 2012

Related U.S. Application Data

(63) Continuation of application No. 12/423,072, filed on Apr. 14, 2009, now Pat. No. 8,228,901.

(51) Int. Cl.
*H04L 12/66* (2006.01)

(52) U.S. Cl.
USPC ............................. 370/352; 370/401; 370/252

(58) Field of Classification Search
USPC .......................................................... 709/238
See application file for complete search history.

(56) References Cited

U.S. PATENT DOCUMENTS

| 8,228,901 | B2* | 7/2012 | Meranchik ..................... 370/352 |
| 2005/0063411 | A1* | 3/2005 | Wang et al. .................... 370/437 |
| 2006/0036761 | A1* | 2/2006 | Amra et al. .................... 709/238 |
| 2006/0195607 | A1* | 8/2006 | Naseh et al. ................... 709/238 |
| 2007/0217410 | A1* | 9/2007 | Kajiyama et al. .............. 370/389 |
| 2009/0129374 | A1* | 5/2009 | Yurchenko et al. ........... 370/352 |

* cited by examiner

*Primary Examiner* — Duc C Ho
(74) *Attorney, Agent, or Firm* — Stradley Ronon Stevens & Young, LLP

(57) ABSTRACT

A telecommunications system is disclosed which may include a VOIP (Voice Over Internet Protocol) network having a plurality of network elements; at least one carrier data center; communication links enabling communication between the network elements and the at least one carrier data center, wherein the carrier data center is operable to receive a query describing a communication session active at a given one of the network elements, over one of the communication links, and to generate a routing table in response to the query.

3 Claims, 5 Drawing Sheets

SYSTEM AND METHOD FOR DYNAMIC CALL ROUTING

CROSS-REFERENCE TO RELATED APPLICATIONS

This application is a Continuation application of U.S. Non-Provisional application Ser. No. 12/423,072, filed Apr. 14, 2009, entitled "SYSTEM AND METHOD FOR DYNAMIC CALL ROUTING", the disclosure of which application is hereby incorporated herein by reference in its entirety.

BACKGROUND OF THE INVENTION

Voice Over Internet Protocol (VOIP) networks have been used to reduce the costs of long-distance telephone calling for several years. A call typically starts at an originating location within a traditional public circuit-switched telephone network (PSTN), interfaces with a VOIP network, then travels through the VOIP network, interfaces with a PSTN on the destination side of the VOIP network, and proceeds through the destination-side PSTN to a termination point to complete the call. Cost reduction is generally achieved by having the VOIP network service as large a part of the distance between the origination point and termination point of the call as possible.

Some calls can be fully connected via the VOIP network, without the PSTN, but for purposes of explanation of the present invention, we assume the VOIP network interfaces to a PSTN, although the invention is not limited thereto.

A call is typically routed through a sequence of intermediary stations within a VOIP network before being transferred from the VOIP network to the destination-side PSTN. These intermediary stations are referred to herein as gateways, call stations, and/or soft switches. In existing VOIP networks, each call station selects from among a number of possible routing options by searching through a large volume of stored routing data in a routing table to identify routing options table corresponding to the pertinent parameters of the telephone call to be routed. In this manner, the path of calls through a sequence of stations may be adjusted based on various factors prevailing at the time of the call. Routing tables that include ordered lists of routing options are typically generated periodically (e.g.; once a week, once a day, etc.) and forwarded to the respective call stations within the VOIP network.

In existing systems, call stations obtain routing options by selecting a routing table based on the characteristics of the call. Factors that may be used to select routing options from the table may include the call prefix, the location of the origin of the call, the carrier, and features sought to be optimized such as quality of service and/or price per minute. The relevant factors are used to select routing options from a routing table stored at the call station.

However, as telecommunication systems have become larger, more complex, and as more options for call handling have developed, the conventional systems have become problematic. First, there are so many different possible routing options—which depend upon so many parameters—that the computational requirements to generate the routing tables are enormous. Second, the storage required to store all the information needed to route any call to anywhere, from anywhere, is huge.

The increasing amount of space and increased computational requirements needed for routing tables is imposing an ever increasing computational and data storage burden on call stations forming part of VOIP networks, which is both expensive and difficult to implement. Accordingly, there is a need in the art for a system and method for routing telephone calls that is less data-storage-intensive, more cost effective, and more convenient than existing systems and methods.

SUMMARY OF THE INVENTION

According to one aspect, the present invention is directed to a telecommunications system that may include a VOIP (Voice Over Internet Protocol) network having a plurality of network elements; at least one carrier data center; communication links enabling communication between the network elements and the at least one carrier data center, wherein the carrier data center is operable to receive a query describing a communication session active at a given one of the network elements, over one of the communication links, and to generate a routing table in response to the query. The generation of the routing table is customized to the call, and is preferable performed in real time, for each specific call.

Because the routing table uses only a small subset of data applicable to the call, the computations required for the routing table are minimal enough to be performed for each call. Because the data set from which the routing table is calculated is limited to that applicable for a particular call, the storage requirements in the network elements are similarly small enough to manage.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" or "in an embodiment" in various places in the specification do not necessarily all refer to the same embodiment.

Figure 1:
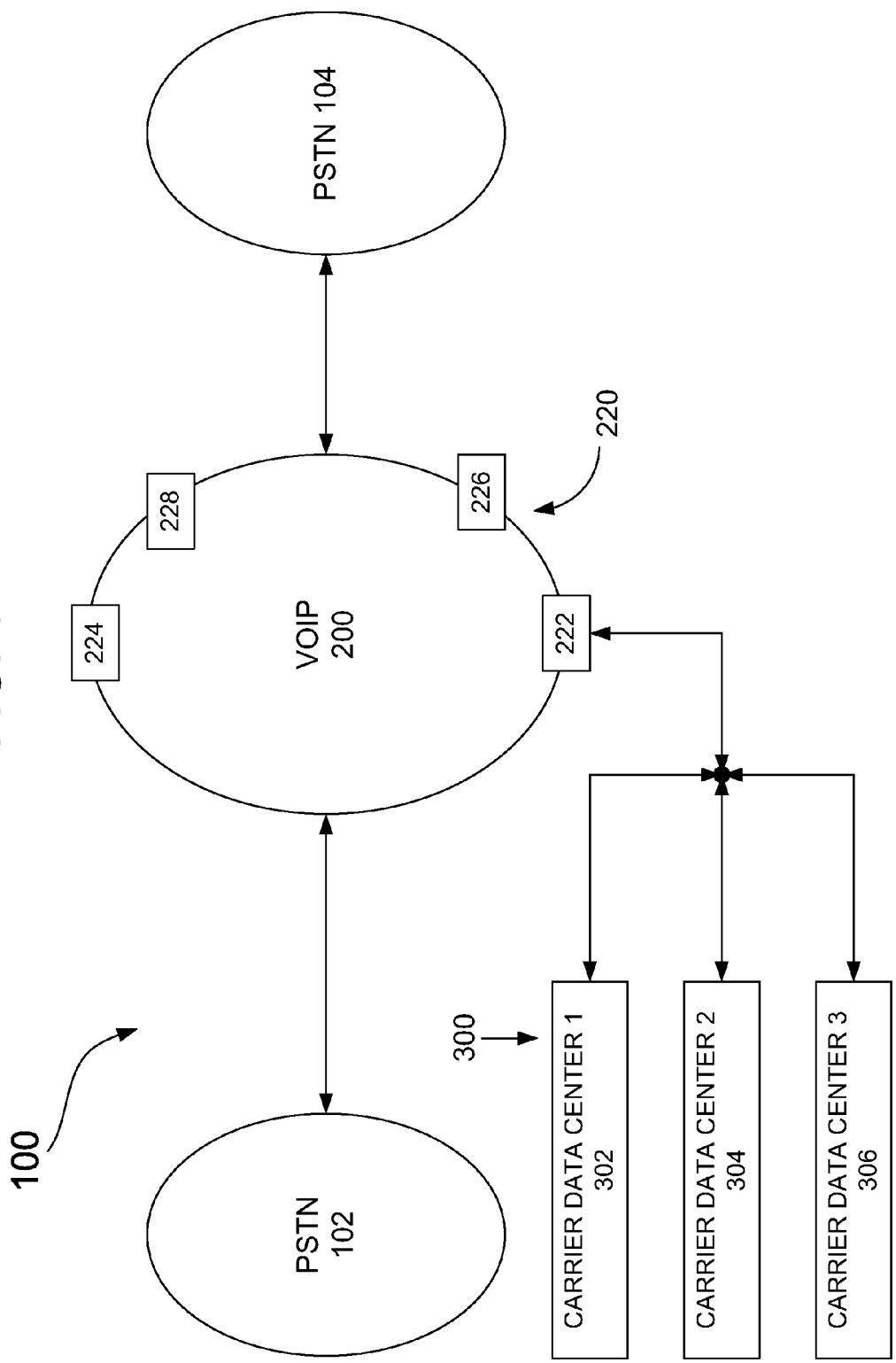
FIG. 1 is a block diagram of a system for enabling calls to be transmitted from a origination PSTN network to a destination PSTN network over a VOIP network, in accordance with an embodiment of the present invention.

FIG. 1 is a block diagram of a system 100 for enabling calls to be transmitted from a origination PSTN network 102 to a destination PSTN network 104 over a VOIP network 200, in accordance with an embodiment of the present invention. VOIP network 200 may include network elements 222, 224, 226, and 228 (collectively 220), which may also be referred to as call stations or gateways. Any number of call stations may be dispersed throughout VOIP network 200 to enable routing of packet data therethrough. However, for the sake of convenience, only call stations 222, 224, 226, and 228 are shown. System 100 may further include carrier data centers 302, 304, and 306.

PSTNs 102 and 104 are preferably conventional public switched telephone networks as are known in the art. VOIP 200 is preferably a packet-switched network in which data packets are transmitted through a sequence of VOIP network elements 220 using soft-switching as needed.

Carrier data centers 302, 304, and 306 (collectively 300) may each store data beneficial for generating a routing table for routing a telephone call that has been received at a call station within VOIP 200 and/or for determining cost and price data for the telephone call or other type of communication session. An embodiment of carrier data center 300 is described in greater detail in connection with FIG. 4 of this disclosure.

Each carrier data center 300 may include at least one computer and at least one mass data storage device such as one or more computer hard drives. In one embodiment, each carrier data center may include a local area network including at least one server computer, a plurality of client computers coupled to the server computer, and one or more mass storage devices accessible to the local area network.

Three carrier data centers 300 are shown, however fewer or more than three such data centers 300 may be employed. Moreover, while carrier data centers 302, 304, and 306 are indicated as being associated with particular carriers, in other embodiments, a single data center could store data for all available carriers. In still other embodiments, data centers that are not affiliated with a particular call traffic carrier may be employed.

In one embodiment, upon receiving a phone call, a network element 222 may communicate with carrier data center 302 to generate a routing table including an ordered list of routing paths for routing the phone call to a destination phone number. Network element 222 may forward information describing characteristics of the telephone call and/or configuration settings of network element 222 to the data center 302. Thereafter, data center 302 may use the data transmitted from network element 222 in conjunction with continuously updated business policies for the carrier associated with carrier data center 302 to generate a no-loss, least-cost routing table for the telephone call in real time. Upon completing generation of the routing table, data center 302 may transmit the routing table back to network element 222 of VOIP network 200 to enable the telephone call to be routed to its destination using routing data included within the transmitted routing table.

Figure 2:
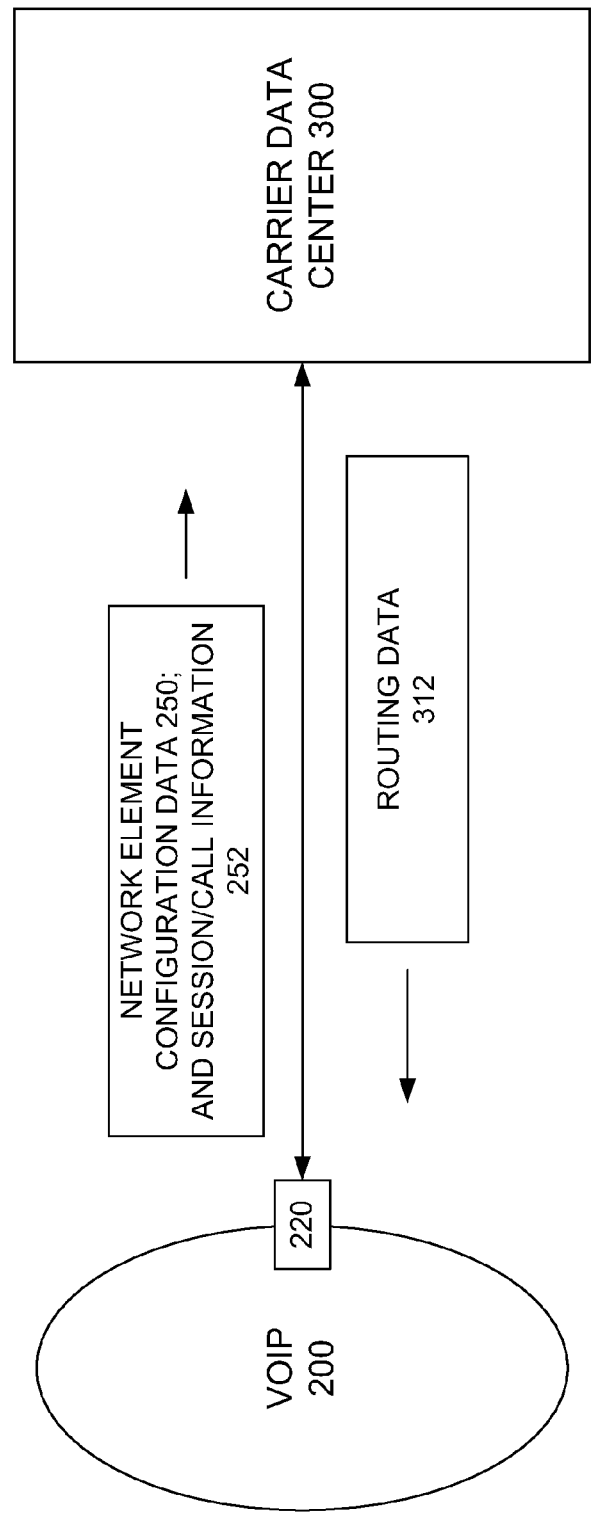
FIG. 2 is a block diagram of a portion of the system of FIG. 1 showing the overall flow of data between a the VOIP network and a carrier data center in accordance with an embodiment of the present invention.

FIG. 2 is a block diagram of a portion of the system of FIG. 1 showing the overall flow of data between a the VOIP network 200 and a carrier data center 300 in accordance with an embodiment of the present invention.

FIG. 2 shows VOIP 200 and a network element 222 of VOIP 200 communicating with a carrier data center 300. The discussion of FIG. 2 is intended to be general to all carrier data centers 300. The general flow of data is described in this section. A more detailed discussion of the processing performed at the carrier data centers 300 is provided later herein.

In the embodiment of FIG. 2, network element 222, after receiving a telephone call (wherein a telephone call is one type of session that may be conducted in a VOIP network) transmits network element configuration data 250 and/or information 252 describing the telephone call to carrier data center 300. Configuration data 250 includes information describing network element 220 to enable routing data, such as in the form of a routing table, to be looked up and/or calculated while taking the characteristics of the network element 220 into account. Similarly, call information 252 is preferably operable to enable carrier data center 300 to look up and/or calculate a routing table while taking the characteristics of the telephone call into account. In other embodiments, network element configuration data 250 could be stored at carrier data center 300 and network element 220 would not need to transmit this data. In this case, network element 220 may only need to transmit data identifying network element 220 to carrier data center 300, following which data center 300 could locally look up the pertinent configuration data for network element 220.

The discussion of FIG. 2 helps illustrate that various embodiments of the present invention are operable to transfer the task of calculating and/or looking up routing data for a particular telephone call (or other type of communication session) present at a network element 220 within VOIP network 200 from the network element to a carrier data center 300, thereby centralizing the routing table generation process and unburdening the respective network elements of this increasingly data-storage intensive and computationally intensive task.

Figure 3:
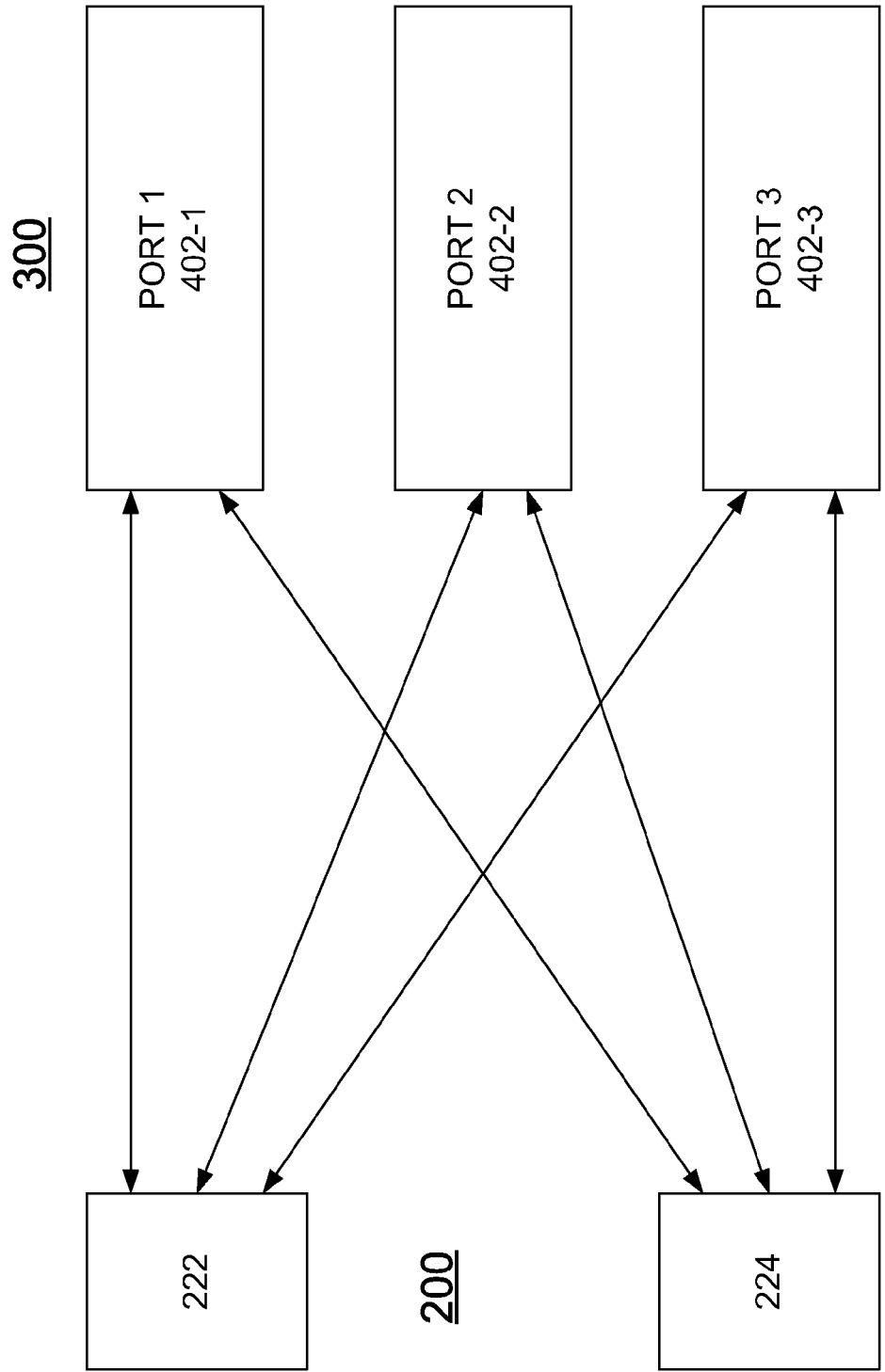
FIG. 3 is a block diagram of a map of communication links between two network elements within a VOIP network and three ports of a carrier data center in accordance with an embodiment of the present invention.

FIG. 3 is a block diagram of a map of communication links between two network elements 222, 224 within a VOIP network 200 and three ports 402-1, 402-3, and 402-3 of a carrier data center 300 in accordance with an embodiment of the present invention. FIG. 3 shows three ports of carrier data center 300, each port having communication links with two network elements 222, 224. This may be beneficial if, for instance, network element 222 is handling more than one phone call for a given data carrier at a given moment. Moreover, the illustrated communication links may be beneficial where more than one network element is handling a phone call for a given carrier at a given moment.

Figure 4:
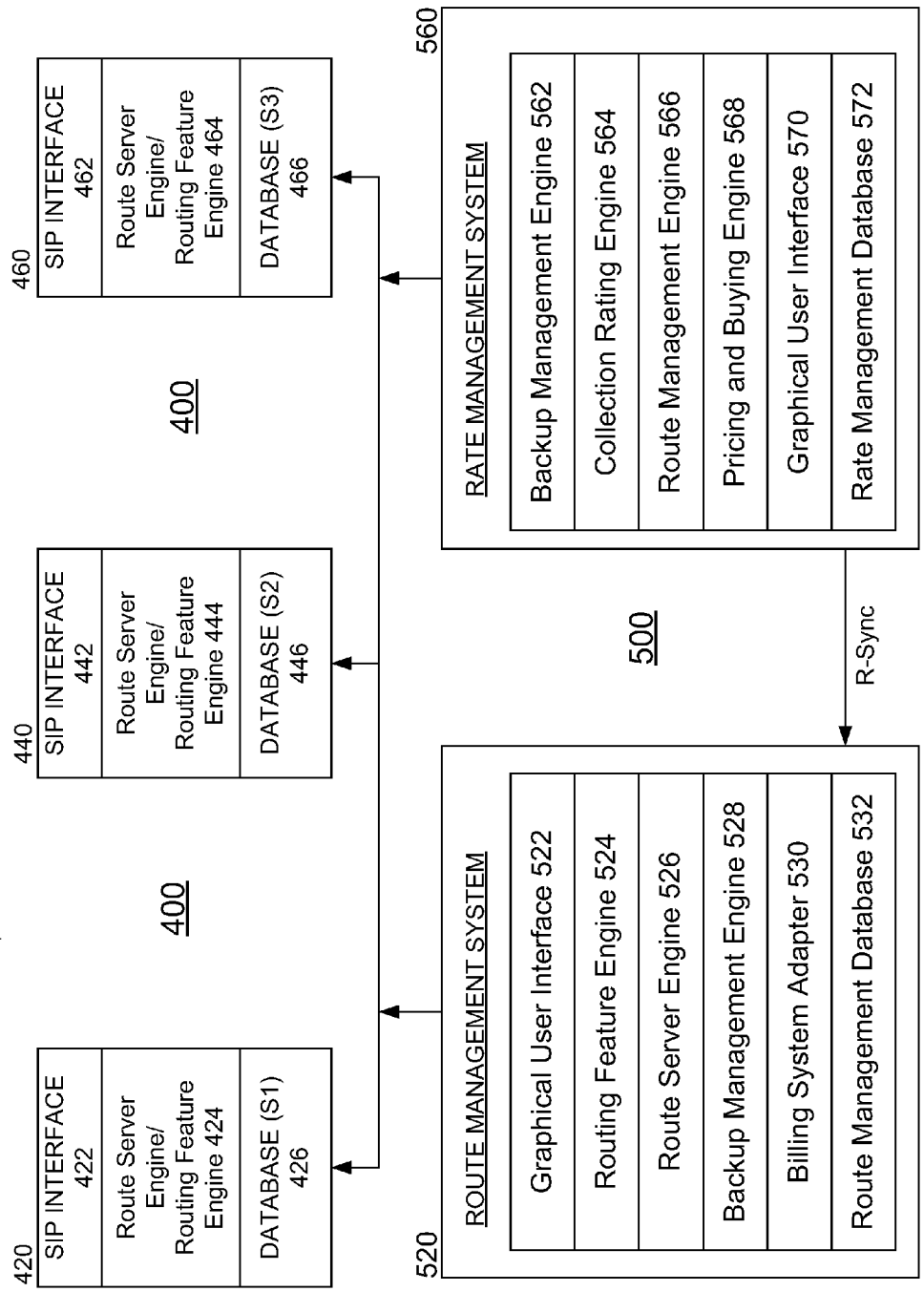
FIG. 4 is a block diagram of a rate/route management system operating within a carrier data center in accordance with an embodiment of the present invention.

FIG. 4 is a block diagram of a rate/route management system 350 in accordance with an embodiment of the present invention. System 350 may form part of a carrier data center 300. Alternatively, system 350 may serve as a centralized system of routing data that serves a multitude of carriers and that is thus not affiliated with any single carrier.

System 350 may include interface servers 420, 440, 460 (collectively 400), route management database 520 and/or rate management database 560 (collectively 500). Interface server 420 may include SIP (Session Initiation Protocol) interface 422, route server engine/routing feature engine 424, and/or database copy 426. Servers 440 and 460 include functional components corresponding to those of server 420, and which are similarly numbered. Thus, for the sake of brevity, the components of servers 440 and 460 are not listed here.

Route management system database 520 may include graphical user interface 522, routing feature engine 524, route server engine 526, backup management engine 528, billing system adapter 530, and/or route management database 532.

Rate management system 560 may include backup management engine 562, collection rating engine 564, collection rating engine 564, route management engine 566, pricing an buying engine 568, graphical user interface 570, and/or rate management database 572.

Preferably, route management system 520 is operable to maintain a database 532 for route management and also preferably includes various functional components needed for updating the database 532 and for determining routing data as a function of characteristics of a given communication session such as a telephone call and/or as a function of the characteristics of a network element 220 that has communicated with carrier data center 300 to receive routing data and based on the business policies of carrier data center 300.

Similarly, rate management system 560 is preferably operable to maintain a database 572 for rate management and also preferably includes various functional components needed for updating the database 572 and for determining rates for telephone calls and/or other communication sessions as a function of characteristics of the given communication session, such as a telephone call, as a function of the characteristics of a network element 220 that has communicated with carrier data center 300 to receive rate and/or routing data, and/or as a function of the business policies of the carrier handling the communication session.

Interface servers 400 are preferably operable to provide greater efficiency for rate/route management system 350 by serving as intermediaries between (a) network elements 220 requesting rate data and routing data and (b) route management system 520 and rate management system 560. Interface servers 420, 440, and 460 are preferably operable to update respective databases 426, 446, and 466 to ensure ready and rapid access to the data therein without having to access the main databases 532 and 572. Servers 420, 440, and 460 preferably also operate to distribute the processing load imposed on rate/route management system 350 to provide greater speed and flexibility in servicing rate and routing data queries and to provide scalability of system 350. Further, code separation may be implemented among servers 420, 440, and 460. Interface servers 400 may be accessible to network elements 220 of VOIP network 200 using a local network, the Internet, and/or a private Wide Area Network (WAN).

Session Border Control (SBC) SIP signaling requests for routes may have the following characteristics. The system disclosed herein may provide load-balanced SIP requests. System 350 may handle both primary and failover SIP requests. System 350 may handle re-direct responses.

The following describes various aspects and benefits of some embodiments of the present invention.

This section describes processes and software applications associated with the integration, operation, and basic functionality of the dynamic no-loss Least Cost Routing (LCR) distribution engine in accordance with an embodiment of the present invention.

Dynamic-LCR is described herein as (1) a group of processes, (2) a group of custom software integration scripts, (3) a route delivery engine; middle-ware software application and (4) a group of very specific network-element 220 configuration parameters.

Group of Processes:

Each carrier may have its own processes for managing its sub-carriers, rates for the sub-carriers and routes for its sub-carriers. An initial part of one embodiment of the method of the present invention is to analyze the carrier's individual back-office processes and applications. This analysis is done to determine the set of processes and custom scripts that will needed to dynamically embed the Dynamic-LCR middleware application into the carriers existing back-office systems.

The process identification includes but is not limited to: carrier management; rate and route management; current routing capabilities and limitations; routing capabilities for which scalability is sought; existing routing operational tasks; and/or structure of back-office systems to define synchronization processes.

Custom Integration Scripts:

In one embodiment, each carrier may have a different back-office data infrastructure. In order to automate the dynamic-LCR system within the network for a carrier, it is beneficial to create a set of custom integration scripts that determine when critical business information has changed and to dynamically deliver the changes in the form of routing instructions to the operational routing mechanisms. The following routing changes may be implemented using the methods disclosed herein: (a) carriers may be added/changed or made active/inactive; (b) carriers' routes and price may be added/changed/deleted/blocked or unblocked; and/or (c) carriers routes/costs may be added/changed/deleted/blocked or unblocked.

Dynamic-LCR Route Engine:

In an embodiment, commercial routing/pricing/costing information may dynamically populate the route server engine 526 via the processes and scripts outlined above. The route server engine 526 may use this information to: (a) dynamically build a no-lost least cost routing table for each origination carrier. The system 350 may support an unlimited number of origination/termination carriers and an unlimited number of origination/termination carrier price/cost structures for the various possible communication-session routes. Thus, in some embodiments rate/route management system 350 is not limited to a single carrier, and may serve any number of carriers.

In an embodiment, the system and method disclosed herein may simultaneously provide support for determining no-loss least cost routing, time-of-day costing, allocation of routing bandwidth priority-based routing, service-level-based routing, and operational blocking at both the global termination route level and at the individual origination route level.

An embodiment may also support destination-based routing, which may include analyzing the called party number in real-time for each call, for each termination carrier, using digit sequences of up to 18 digits. The system may then determine which termination carriers are available for routing calls, by eliminating any carriers having unacceptable costs, that have been operationally blocked, or that do not meet service-level criteria. The remaining termination carriers may then be sorted by according to bandwidth allocation, priority, and least-cost routing criteria. An indication of the remaining available carriers may be returned to the network element in a SIP 302 re-redirect response message.

Further, a system and method as disclosed herein may support US domestic ANI (Automatic Number Identification) based routing, and/or intra-state, inter-state, LATA (Local Access and Transport Area), and/or OCN (Operating Company Number). The system disclosed herein may then compare the called party number to the calling party number and utilize price and cost information based on the response, and may then route the call using the destination-based routing described above.

Local Number Portability (LNP) Support:

The system disclosed herein may query an NPAC (Number Portability Administration Center) database to determine number portability. If the number has been ported, the system will compare ANI to LRN (Location Routing Number) and determine routing instructions for the call using methods including destination-based routing as discussed above. The system may populate SIP options messages appropriately for ported and dipped calls.

An embodiment of the system and method herein provides digit validation. A system according to this embodiment enables blocking invalid digit lengths and returning a message "invalid digit length" (a 503 message).

One embodiment of the method herein enables real-time route changes, which preferably enables changes within the dynamic routing engine to be implemented in real time and to take effect on the next inbound phone call that succeeds the change within the routing engine.

An embodiment of the system and method disclosed herein are platform-independent. A preferred system herein may support any and all VOIP 200 network elements 220 which can handle SIP 302 redirect messages with multi-RURI contact headers. Such Redirect-Uniform Resource Identifier (RURI) messages are in the well defined SIP standards.

Specific Network Element Configurations

Specific network element 220 configuration settings may be implemented to aid in transferring the routing task from the individual network elements 220 to a routing engine 526 that is located remotely from the network elements 220. These configuration settings are specific to the combined solution of carrier back-office systems, the Dynamic-LCR solution, and the specific network element.

The network element 220 configuration is preferably selected to accommodate the following factors: CDR (Call Detail Record) collection/mediation, end-point configuration and prefix translation, origination carrier authorization, and termination carrier route/endpoint configuration.

The system disclosed herein may accommodate the following types of network element 220: (a) SIP-Only single port model, with or without call admission control; (b) mixed-mode, single-port model, with call admission control; and/or (c) mixed mode dual port model, with call admission control.

Figure 5:
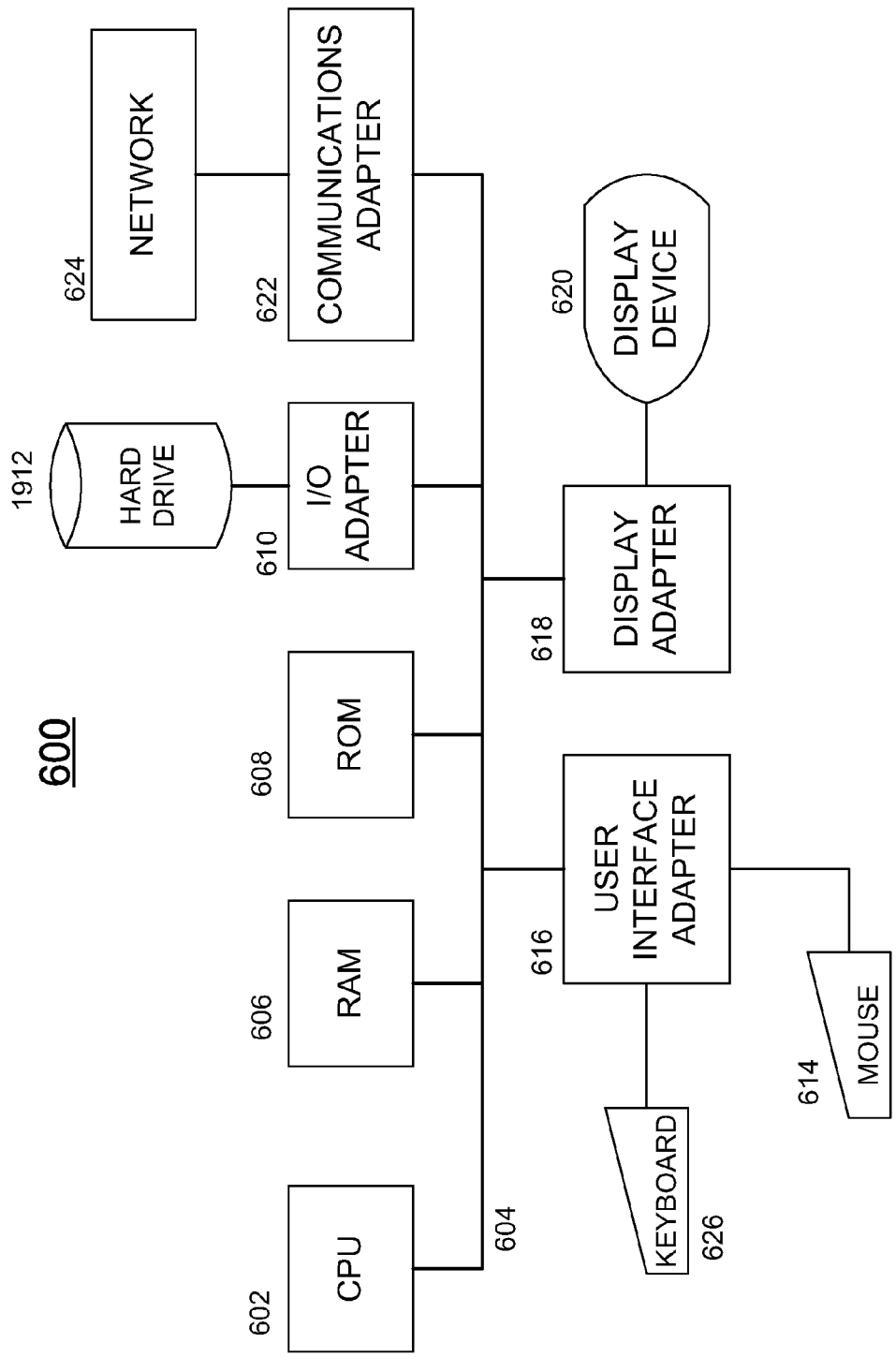
FIG. 5 is a block diagram of a computer system adaptable for use with an embodiment of the present invention.

FIG. 5 is a block diagram of a computing system 600 adaptable for use with one or more embodiments of the present invention. For example, computing devices at network elements 220, at carrier data centers 300, and/or within rate/route management system 350 may employ one or more computers having one or more of the computing system components shown in FIG. 5.

In an embodiment, central processing unit (CPU) 602 may be coupled to bus 604. In addition, bus 604 may be coupled to random access memory (RAM) 606, read only memory (ROM) 608, input/output (I/O) adapter 610, communications adapter 622, user interface adapter 606, and display adapter 618.

In an embodiment, RAM 606 and/or ROM 608 may hold user data, system data, and/or programs. I/O adapter 610 may connect storage devices, such as hard drive 612, a CD-ROM (not shown), or other mass storage device to computing system 600. Communications adapter 622 may couple computing system 600 to a local, wide-area, or global network 624. User interface adapter 616 may couple user input devices, such as keyboard 626 and/or pointing device 614, to computing system 600. Moreover, display adapter 618 may be driven by CPU 602 to control the display on display device 620. CPU 602 may be any general purpose CPU.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A telecommunications system comprising:
   a VOIP (Voice Over Internet Protocol) network having a plurality of network elements;
   at least one carrier data center;
   communication links enabling communication between the network elements and the at least one carrier data center,
   wherein the carrier data center is operable to receive a query describing a communication session active at a given one of the network elements, over one of the communication links, and to cause the generation of a routing table in response to the query, said generation being either at the carrier data center or at the network element;
   and further wherein the carrier data center comprises:
   a rate management system operable to determine costs and prices for a plurality of possible routes for the communication session; and
   a route management system operable to generate, in real time, a routing table for the communication session.

2. The telecommunications system of claim 1, wherein the carrier data center comprises:
   a plurality of interface servers operable to serve as intermediaries between (a) the rate management system and route management system and (b) network elements of the VOIP network.

3. The telecommunications system of claim 1 wherein the route management system is operable to generate a routing table by at least one of:
   (a) looking up a database of routing tables using the communication session query; and
   (b) calculating an ordered list of routes using the communication session query data and data included in business policies of the carrier data center.

* * * * *